United States Patent
Bachman et al.

(10) Patent No.: US 6,895,386 B1
(45) Date of Patent: May 17, 2005

(54) STOCK CREDIT CARD

(75) Inventors: Richard Bachman, Scarsdale, NY (US); Patrice Pilkonis, New York, NY (US)

(73) Assignee: Citibank, N.A., New York, NY (US)

( * ) Notice: Subject to any disclaimer, the term of this patent is extended or adjusted under 35 U.S.C. 154(b) by 787 days.

(21) Appl. No.: 09/172,020

(22) Filed: Oct. 14, 1998

Related U.S. Application Data

(60) Provisional application No. 60/062,469, filed on Oct. 15, 1997.

(51) Int. Cl.[7] .............................................. G06F 17/60
(52) U.S. Cl. ............................. 705/14; 705/1; 705/30; 705/35; 705/41
(58) Field of Search ............................... 705/14, 1, 30, 705/35, 41

(56) References Cited

U.S. PATENT DOCUMENTS

| | | | | |
|---|---|---|---|---|
| 4,750,119 A | * | 6/1988 | Cohen et al. .................. | 705/14 |
| 5,025,372 A | | 6/1991 | Burton et al. ................ | 364/406 |
| 5,202,826 A | * | 4/1993 | McCarthy ...................... | 705/14 |
| 5,233,514 A | * | 8/1993 | Ayyoubi et al. ............... | 705/14 |
| 5,515,270 A | * | 5/1996 | Weinblatt ...................... | 705/14 |
| 5,537,314 A | * | 7/1996 | Kanter .......................... | 705/14 |
| 5,627,973 A | * | 5/1997 | Armstrong et al. ........... | 705/10 |
| 5,734,838 A | | 3/1998 | Robinson et al. ........... | 395/214 |
| 5,787,404 A | | 7/1998 | Fernandez-Holmann ..... | 705/35 |
| 5,857,175 A | * | 1/1999 | Day et al. ...................... | 705/14 |
| 5,937,391 A | * | 8/1999 | Ikeda et al. ................... | 705/14 |
| 6,029,139 A | * | 2/2000 | Cunningham et al. ........ | 705/10 |

* cited by examiner

*Primary Examiner*—Tariq R. Hafiz
*Assistant Examiner*—Akiba Robinson-Boyce
(74) *Attorney, Agent, or Firm*—George T. Marcou; Kilpatrick Stockton LLP

(57) ABSTRACT

A method and system for purchasing assets on behalf of customers who use financial transaction media such as credit cards, ATM/CAT cards, and electronic commerce managed by a financial institution. As the customer uses his financial transaction medium to purchase goods and services, he generates a sum of purchases. This sum is converted into incentive points that are added to incentive points previously earned. When the customer has enough incentive points, the method or system purchases an asset, such as a stock, on the customer's behalf, using the incentive points. The utilization of this method or system may be over a short-time promotional period, or it may commemorate a special occasion, or it may be used as part of a compensation package for an employee of a corporation.

30 Claims, 7 Drawing Sheets

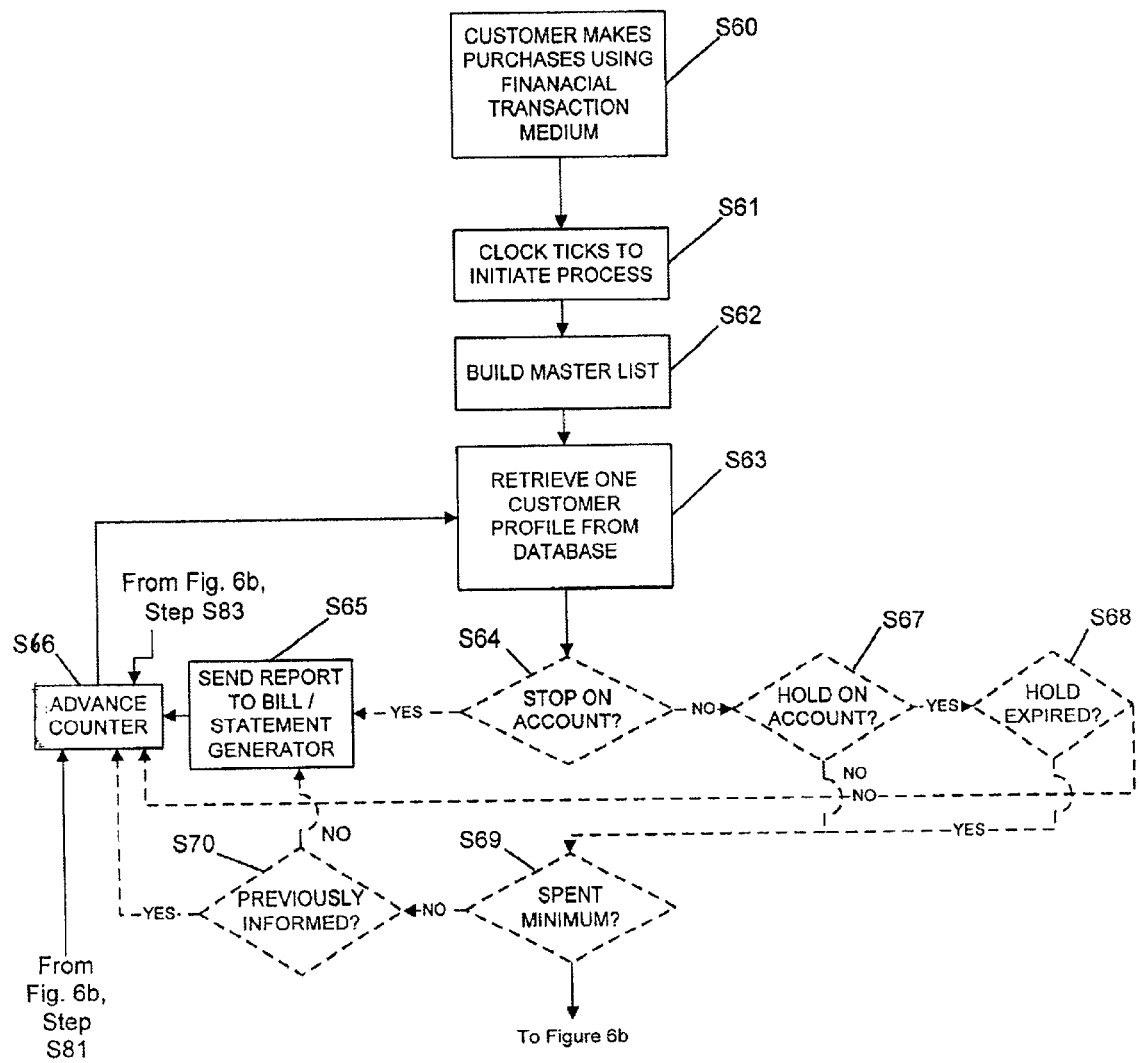

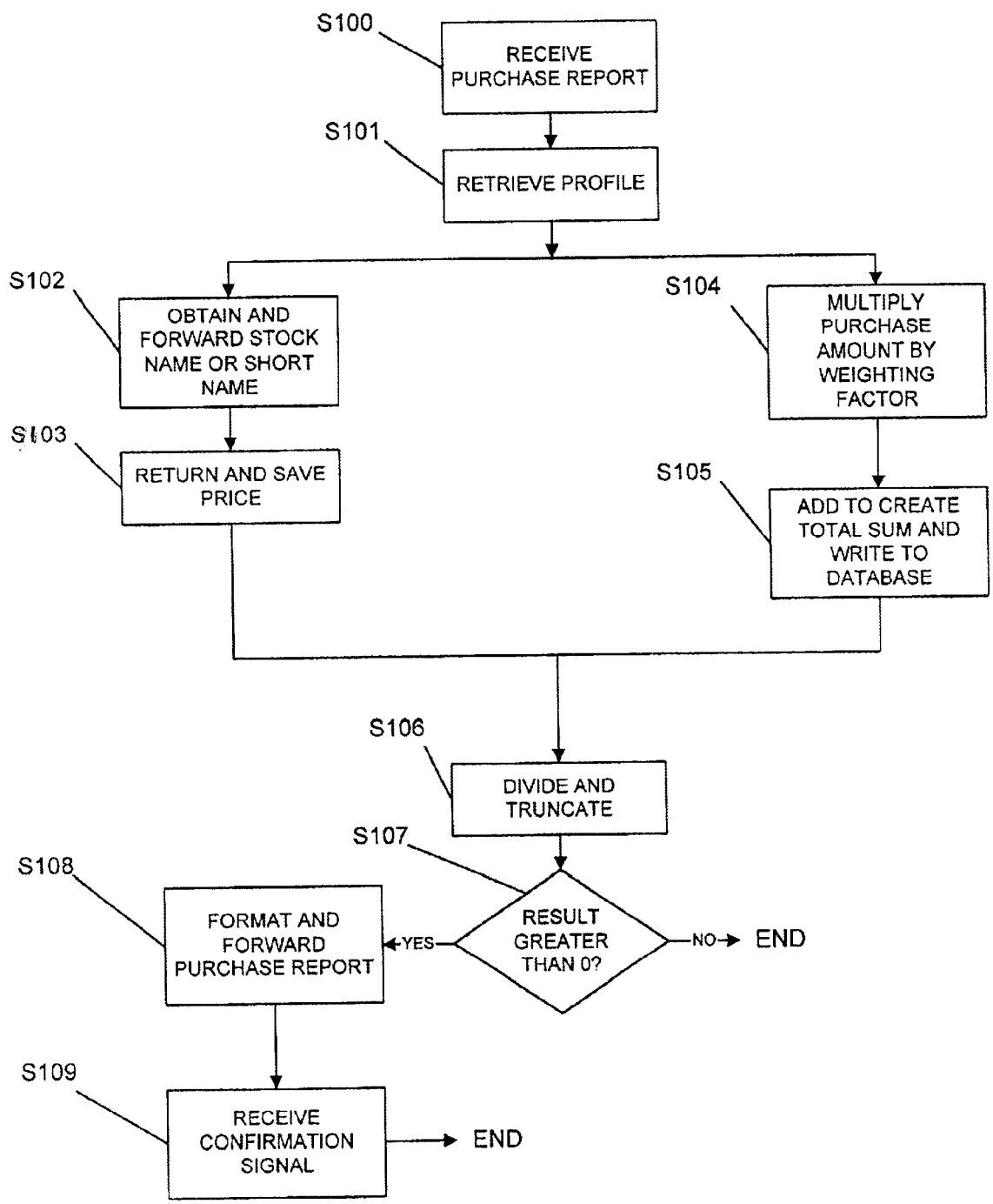

STOCK CREDIT CARD

This application claims priority from copending provisional application 60/062,469 entitled "Stock Credit Card" filed on Oct. 15, 1997.

BRIEF DESCRIPTION OF THE INVENTION

This invention relates to multiple use of transaction devices, and particularly to a system and method of increasing usage of transaction devices as well as loyalty towards a company by providing incentives to the customers in the form of stock investments in the company.

BACKGROUND OF THE INVENTION

Many conventional transaction cards, such as credit cards, or other financial transaction devices provide incentives to the customers to encourage use of their cards over other transaction cards or other forms of exchange. Typically, this involves using a credit card where the customer gets one free frequent flier mile with a particular airline for every dollar he or she charges on his or her credit card. By getting free frequent flier miles, the customer is enticed to use this particular credit card over other credit cards, money, checks, and automated bank cards. Similar incentive programs include obtaining points or dollars towards the purchase of automobiles, electronic equipment, music CDs, and phone service.

Typical examples of the prior art relating to such transaction devices include the following. U.S. Pat. No. 5,787,404 issued to Fernandez-Holmann discloses a system for using a credit card for two purposes. The first purpose is to provide a method of payment into an individual's retirement fund should the individual forget to make a payment. The individual's credit card is debited, and the money is transferred to the individual's retirement fund if a payment is not made into the retirement fund by a specified date. The second purpose of the system is to provide a method of allowing an individual to contribute to his retirement fund by having a percentage of total purchases made with the credit card within a month deposited into the retirement fund from the credit card issuing company.

This system is limited in many ways. First, the individual cannot use his incentives to purchase particular stocks in particular companies. Retirement funds are typically managed by a company or person who decides into which investments to buy given the state of the various markets and the managing company's or person's intuition. The actual cardholder cannot make any decision regarding his contributions to his retirement fund at any time.

Additionally, the Fernandez-Holmann patent only addresses retirement funds or other long-term investments. It does not provide for a more liquid-type asset, such as a stock purchase, which can be liquidated relatively quickly without penalty.

Another issue not addressed by the invention of the Fernandez-Holmann patent is the lack of loyalty between the customer and the investments made on the cardholder's behalf through this system. In this system, the customer typically does not know exactly where his funds are going because the decision to place the funds into a particular asset is performed by a company or manager who is not the customer. Therefore, the cardholder cannot develop a loyalty to a particular company through a retirement fund since it is very likely the cardholder's funds will be spread across a plurality of investments unbeknownst to the cardholder.

The invention of the Fernandez-Holmann patent also suffers from its inability for the cardholder to exercise control over his rebates. Every specified time period, the total amount of purchases by the cardholder are used to calculate how much money is to be deposited into the retirement fund. If market forces are weakening over a projected short term, it would be in the best interest of the cardholder to hold this automatic payment and wait for costs of certain investments to stabilize before purchasing them. This will avoid a short term loss that gets amplified over the long term.

There are also six problems typically associated with the conventional incentive programs mentioned earlier. First, the incentives to the customer, such as accruing frequent flier miles and points redeemable for money back on the purchase of a new car or electronics, do not fit every credit customer. Most people purchase a car every three years or longer. Thus, if the customer is only a moderate card user, he will not acquire enough redeemable points to see a real difference in the purchase price of a car. The same proposition holds true for a person redeeming his frequent flier miles. A moderate card user receives a travel voucher for a flight of 25,000 miles or less or an upgrade to first class only after a lengthy time period of credit card usage. Thus, the prospect of either a small reward or the prospect of receiving any reward in the distant future is not enough of an incentive for a customer to use his credit card over any other form of payment.

Second, most incentive programs place expiration dates on the incentive points. Typically, this requires a person to redeem his frequent flier miles or other incentive points towards an automobile rather quickly. Thus, a customer may purchase a flight or a car before he or she truly wants to in order to avoid the expiration of the accrued incentive miles or points.

Third, due to the expiration of incentive points, a burden is placed on the customer to check when those incentive points expire. A customer who plans to utilize the incentive points must continually be aware of when they expire so as to be able to take advantage of them before they expire.

Fourth, the value of the incentive points to the customer is typically only observed once. When the incentive points are redeemed, the customer does not receive any financial benefit in the future. This is especially true when the customer acquires frequent flier miles. Once the customer has purchased his plane ticket using his incentive points, he will not receive any financial benefit from those points in the future.

Fifth, the redemption of the incentive points is not automatic. The customer must specifically request when he or she chooses to redeem the incentive points. This requires the customer to coordinate the purchase to be made with a convenient time in his or her life. If the customer cannot redeem his or her incentive points at a particular time due to the customer being busy with other things, the customer my lose the incentive points after an expiration date.

Sixth, the current incentive programs do not build loyalty with a particular company. The reason is that most incentive point systems are used to purchase goods from the company providing goods or services rather than the company itself. The cardholder only cares about getting the final product and not the health of the company. This relationship does not build loyalty as much as if the cardholder were an owner of the company. By owning a part of the company, the cardholder will be more loyal to the company.

There is a therefore a need to provide incentives to credit card and other financial transaction media customers which encourage the customers to use their credit cards or other financial transaction media over money and the credit cards of other financial institutions. For example, there is a need to eliminate the relatively long length of time a customer must use his financial transaction medium before he may acquire enough incentive points in order to redeem them for an appreciable difference in cost when obtaining or purchasing goods or services using the incentive points. Additionally, there is a need to alleviate the problem of expired incentive points as well as the burden on the customer in monitoring his incentive points so that he may use them before they expire. Additionally, there is a need to provide items or services which can be obtained by a customer once, but than have potential increased value in the future. Also, there is a need for a method and system that automatically redeems a customer's acquired incentive points for valuable goods and services such that the burden of monitoring the acquired incentive points is alleviated. Finally, there is a need to use acquired incentive points that are redeemed under the customer's control such that the customer builds a loyalty to a particular company.

SUMMARY OF THE INVENTION

It is an objective of the present invention to solve the above mentioned problems by providing incentive points to customers that translate more quickly into economic gains that can be realized immediately and in the future. Additionally, the present invention alleviates for the customer the burden of acquiring incentive points for a protracted period of time before there is enough equity to merit redeeming them. Also in accordance with the present invention, the incentive points are automatically redeemed so that the customer is relieved of the burden of waiting for a convenient time to redeem them or having to redeem them before they expire.

Additionally, the present invention allows a customer, in particular an employee or share holder, to invest in a particular company and build loyalty towards that company while acquiring an asset that can be easily liquidated should the customer desire. Also, the present invention allows a customer to wait for a specified period of time before redeeming his earned incentive points to take advantage of a declining price in the asset being purchased.

To achieve the stated and other features, advantages and objects of the present invention, an embodiment of the invention provides a method encompassing the summation of purchases made by a customer using a financial transaction medium; multiplying the obtained sum by a factor to obtain a weighted sum; retrieving a price of an asset to be purchased; comparing the price of the asset to be purchased to determine if the weighted sum is at least equal to the price of the asset and forwarding a message to an appropriate institution to purchase the asset.

To achieve the stated and other features, advantages and objects of the present invention, an embodiment of the invention provides further method steps that hold or stop the purchase of the asset or the acquisition of more incentive points as well as utilizing the method and system of the present invention to commemorate special events, to encourage the use of a particular financial transaction medium such as credit cards and electronic commerce, and the utilization of the present invention in a contest format.

To achieve the stated and other features, advantages and objects of the present invention, an embodiment of the invention provides a system comprised of an arithmetic logic unit; a first access unit for obtaining data from and writing data to a database; a second access unit for obtaining data regarding a price of an asset; a memory unit for storing data retrieved from the first and second access units and a controller that controls the various components.

BRIEF DESCRIPTION OF THE DRAWINGS

In the Figures:

FIGS. 6a and 6b present a flow diagram of a process for accruing incentive points and purchasing stocks periodically in accordance with an embodiment of the present invention;

FIG. 8 is a flow diagram of a process for accruing incentive points and purchasing stocks continuously based upon purchases made by the customer in accordance with another embodiment of the present invention.

DETAILED DESCRIPTION

An embodiment of the present invention allows a customer to use a credit card or another financial transaction medium to make purchases of goods and services. The total purchases made over a period are summed and this sum is multiplied by a weighting factor to achieve a weighted sum. Typically the weighting factor is a percentage such that if the customer spends $100 during a billing cycle, quarter or year, he will receive 1 incentive point if the weighting factor is 1%. The weighted sum is added to previously obtained weighted sums to obtain a total weighted sum. A price of an asset is obtained and compared with the total weighted sum. If the weighted sum is at least equal to the price of the asset, a report is sent out requesting an institution to purchase the asset on the customer's behalf.

Financial Transaction Media

Figure 1:
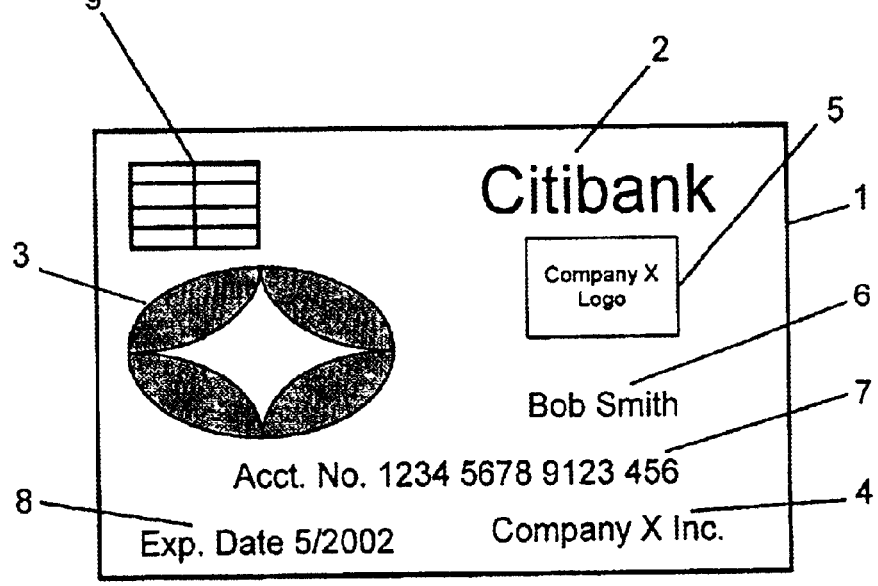
FIG. 1 shows an example of a co-branded credit card that can be used in accordance with an embodiment of the present invention.

FIG. 1 is an example of one side of a co-branded credit/debit card that may be used in accordance with the present invention. The co-branded credit card 1 typically contains the financial institution's name 2 that issued the credit card, a logo representing the issuing financial institution 3, the name of the corporation co-branded with the credit card 4, a logo representative of the co-branding corporation 5, the name of the customer 6, the credit card account number 7, the expiration date of the credit card 8, and contact points 9 for the semiconductor circuit (seen on smart cards).

A co-branded credit card, such as the one shown in FIG. 1, is used in accordance with the present invention when the co-branded corporation 4 (e.g., Company X Inc.) agrees with the card issuing institution 2 to allow customers, particularly share holders in the corporation, to earn incentive points redeemable for stocks in the co-branded corporation 4. Thus, as the customer makes purchases with the co-branded credit card 1, the total dollars spent are converted into incentive points using a formula. The system and the method of the present invention either make stock purchases periodically using the card of FIG. 1, as described in conjunction with FIGS. 6a and 6b, or continuously, as described in conjunction with FIG. 8. When incentive points are redeemed, either the card issuing institution, the co-branded corporation or a combination of the two pay for the stock purchase on behalf of the customer in exchange for redemption of the accrued incentive points.

Figure 2:
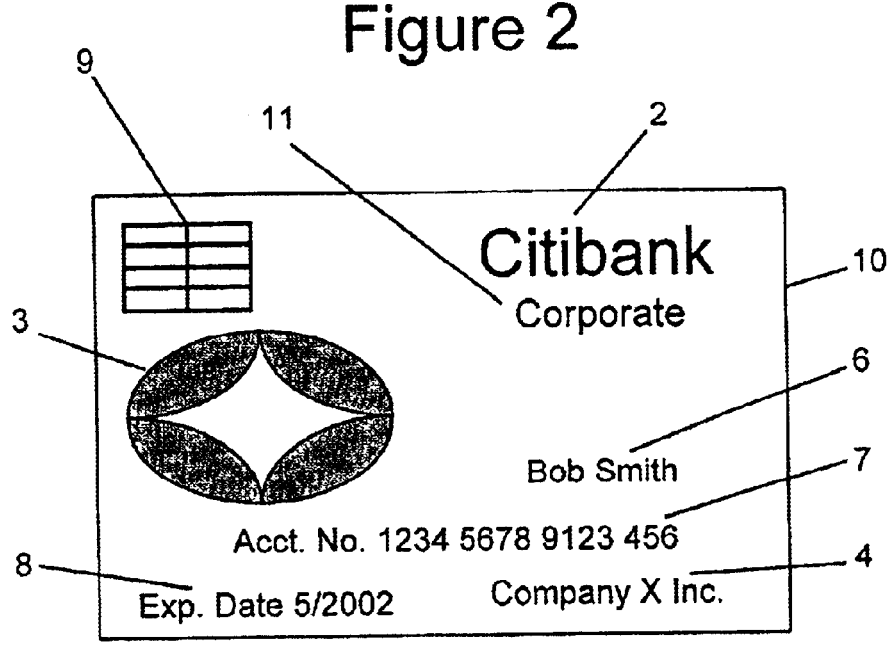
FIG. 2 shows an example of corporate credit card that can be used in accordance with an embodiment of the present invention.

FIG. 2 is an example of one side of a corporate credit/debit card that may be used in accordance with the present invention. The credit/debit card 10 contains the card issuing institution's name 2, the card issuing institution's logo 3, the customer's name 6, the credit card account number 7, the expiration date of the credit card 8, contact points 9 for the semiconductor circuit (seen on smart cards), a designation that the card is a corporate card 11, and the name of the corporation associated with the corporate card 4.

The card 10 is typically used in the present invention when the customer pays for a good or service that is associated with the corporation's business. Popular uses of corporate cards are taking prospective clients to lunch and purchasing airline tickets for business travel. A difference between the co-branded card 1 of FIG. 1 and the corporate card 10 of FIG. 2 is that the customer of the co-branded card 1 pays the bills for items charged on it, while the corporation named on the credit card pays for the customer's charges when he uses card 10. However, the customer receives the stock purchases in his name while the corporation pays the bills. Typically, the bill is paid by either the corporation paying the bill directly or the cardholder paying the bill first and later being reimbursed by the corporation.

Similar to the co-branded card 1, charges placed on the corporate card 10 accrue over time. Also similar to the co-branded card 1 of FIG. 1, the system and method of an embodiment of the present invention may be used to purchase stock periodically, as described in conjunction with FIGS. 6a and 6b, or continuously, as described in conjunction with FIG. 8.

Figure 3:
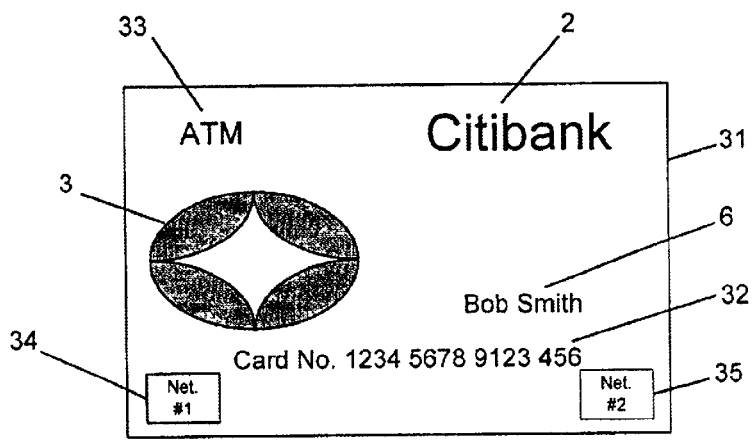
FIG. 3 is an example of an ATM/CAT card that can be used in accordance with an embodiment of the present invention.

FIG. 3 is an automatic teller machine/customer access terminal (ATM/CAT) card which may be used in accordance with the present invention. Like the cards in FIGS. 1 and 2, the ATM/CAT card 31 of FIG. 3 contains the name of the issuing financial institution 2, the issuing institution's company logo 3, the name of the customer 6, the card number 32, a designation that it is an ATM/CAT card 33 and logos or other identifiers indicating which ATM/CAT networks accept this type of card 34, 35.

In FIG. 3, the ATM/CAT card 31 is not typically co-branded, nor is it typically a corporate card. However, it may be associated with a corporation after it is issued for only a specific time period, such as during a promotion.

Much like the cards shown in FIGS. 1 and 2, the customer receives incentive points for a certain percentage of every dollar spent via the ATM/CAT card 31. Also like the cards shown in FIGS. 1 and 2, the card of FIG. 3 may be used to purchase stock periodically, as described in conjunction with FIG. 6a or 6b, or continuously, as described in conjunction with FIG. 8.

Figure 4:
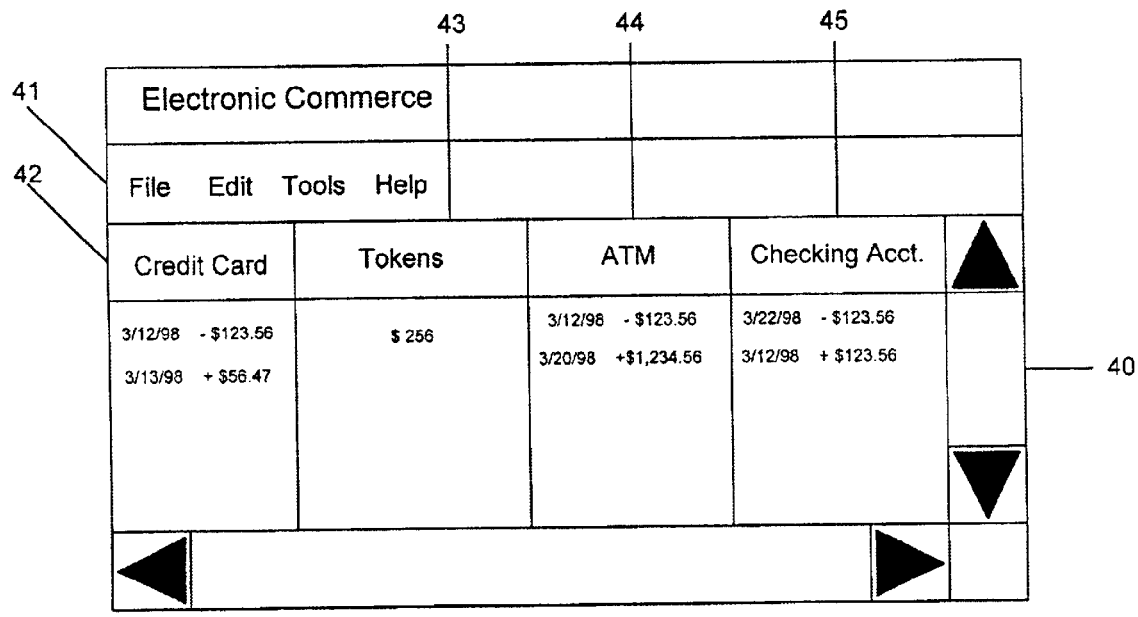
FIG. 4 is an example of a screen shot of electronic commerce service/system that can be used in accordance with an embodiment of the present invention.

FIG. 4 is an example of a WINDOWS™-based electronic commerce screen 40 that can be used in accordance with the present invention. The standard WINDOWS™ features 41 are shown (e.g., File, Scroll Bar, Edit, etc.), but will not be described. The relevant parts of electronic commerce include how purchases are made over a network, described as follows. The customer may purchase items over the network with tokens 43 acquired from a financial institution, a credit card 42, an ATM/CAT card 44, or via an electronic check 45. In general, the customer makes a purchase by selecting which form of payment the customer desires to utilize, or the customer may cancel a purchase within a specified time period before the sale becomes final. In electronic commerce, all advertising, sales, cancellations, etc. are handled through a network, rather than through personal or mail-based transactions, as is known in the art.

Generally, whenever a customer uses any method of purchase shown in FIG. 4, the overall account (i.e., the electronic commerce account which encompasses the four methods of payment shown) is credited with incentive points. Beyond these financial transaction media described above, it is contemplated that the present invention may be used with any financial transaction media where an entity keeps track of the purchases made in order to award incentive points. Similarly to the cards shown in FIGS. 1–3, the system and the method of an embodiment of the present invention may be used with the electronic commerce service shown in FIG. 4 to purchase stocks periodically, as described in conjunction with FIG. 6a or 6b, or continuously, as described in conjunction with FIG. 8.

System Overview

This section describes the system used to determine how many incentive points a particular cardholder receives in a given time period as well as when and how many stocks are purchased on behalf of the cardholder. In order to make these calculations and determinations, the system has at least one access unit that is used to access the issuing financial institution's database where a customer's purchases are stored. This access unit, or another access unit, is used to obtain stock price quotes and forward a purchase request to an institution which makes the actual stock purchase. Beyond these features, the system contains a memory for storing various information, an arithmetic logic unit for performing calculations, a report generator for producing a report regarding a stock purchase that the stock purchasing institution understands and a controller for controlling the various components in synchronization.

Figure 5:
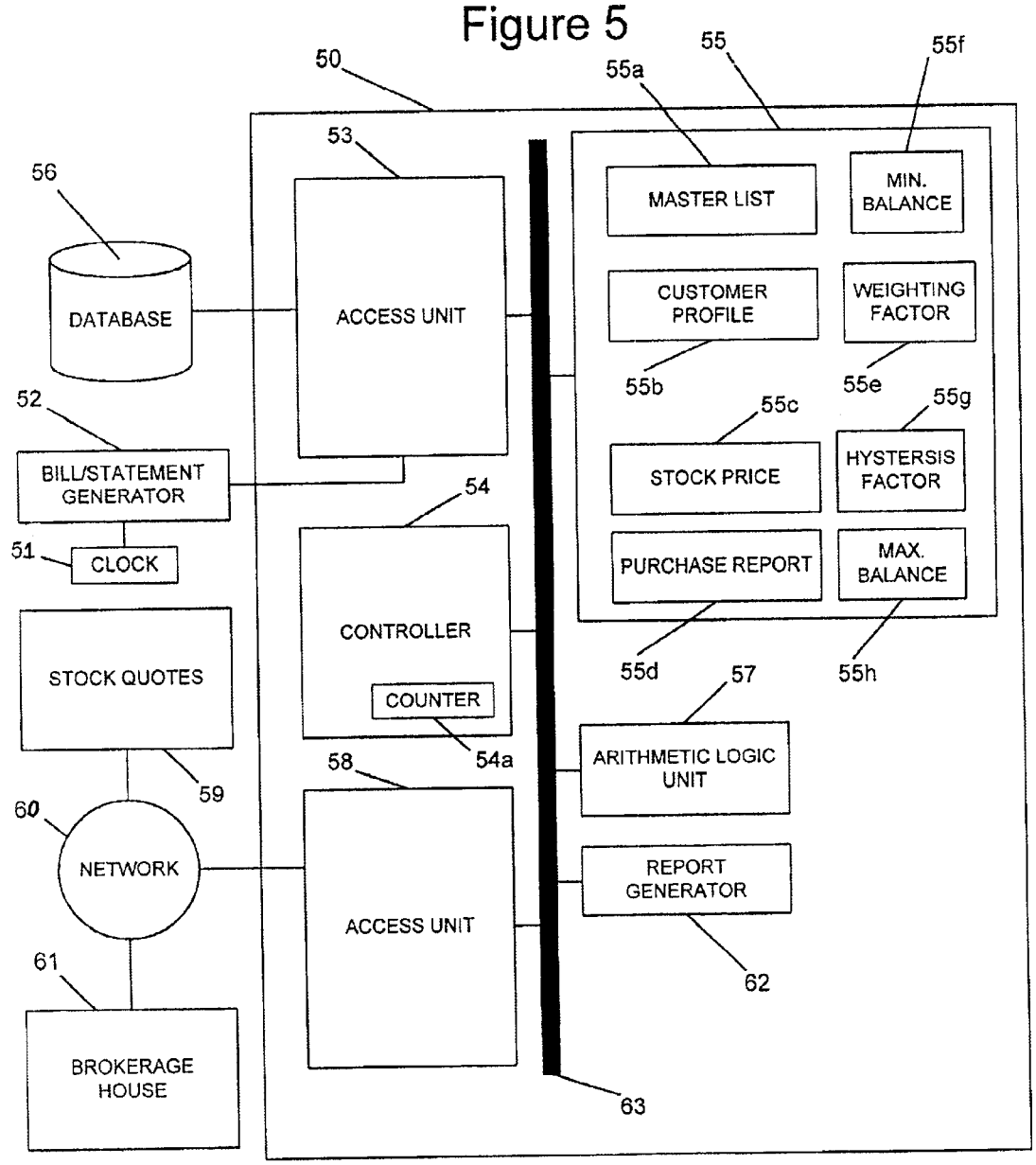
FIG. 5 is a flow diagram of a system for use in accordance with an embodiment of the present invention.

FIG. 5 shows a more detailed system in accordance with an embodiment the present invention. Various embodiments of the present invention are comprised of either software, hardware, or a combination of both. For example, a portion of the system 50 represents a server operated by a card-issuing institution, in which all of the elements within the server 50 are software routines, except memory 55 and arithmetic logic unit 57. The controller 54 and access units 53 and 58 are hybrids containing both hardware components and software components. External to the card-issuing institution's server 50, according to an embodiment of the present invention, are a database 56, a stock quoting service 59, a network 60, and a brokerage house 61. Additionally, FIG. 5 shows a clock 51 and a bill generator unit 52 external to the server (e.g., these processes/hardware components are located on another server or computer). The clock 51 and bill generator 52 could be internal to this server 50 in another embodiment. Also, while shown as two separate elements, an alternative embodiment could utilize a single access unit to retrieve and send data to and from the database 56, bill/statement generator 52, stock quoting service 59 and brokerage house 61.

The system on server 50 contains a controller 54 for controlling the various operations. Within the controller is a counter 54a. Access units 53, 58 are used to transmit and receive data external to the server 50. Memory 55 holds various data such as a Master List 55a, a Customer Profile

55b, a Stock Price 55c, a Purchase Report 55d, and a Weighting Factor 55e. In an alternative embodiment, the memory unit 55 also contains a Minimum Balance 55f, a Hysteresis Factor 55g, and a Maximum Balance Factor 55h. In addition to these data, the server 50 contains a report generator 62, an arithmetic logic unit 57, and a bus structure 63 for interconnecting the various elements. The functions of these various components are described in conjunction with FIGS. 6a and 6b.

Periodically Calculating Newly Accrued Incentive Points and Determining if a Stock is to be Purchased This subsection shows the method steps a system goes through in order to determine how many incentive points a customer obtains in a given period as well as the determination if there are enough accrued incentive points to pay for a stock purchase. In general, the process shown in FIGS. 6a and 6b generates a master list on a periodic basis and selects individuals from that list to determine accrued incentive points. The accrued incentive points are calculated by summing the purchases made during the given time period (i.e. a month, a quarter or a year) and multiplying that sum by a percentage (i.e. $1000 worth of purchases garners the customer $50 worth of incentive points). This value is then added to previously calculated percentages (i.e. last few months, quarters or years). This sum is compared with an obtained stock price and if there are enough incentive points, a request is placed with the appropriate institution to make the purchase of stock on the customer's behalf.

Figure 6B:
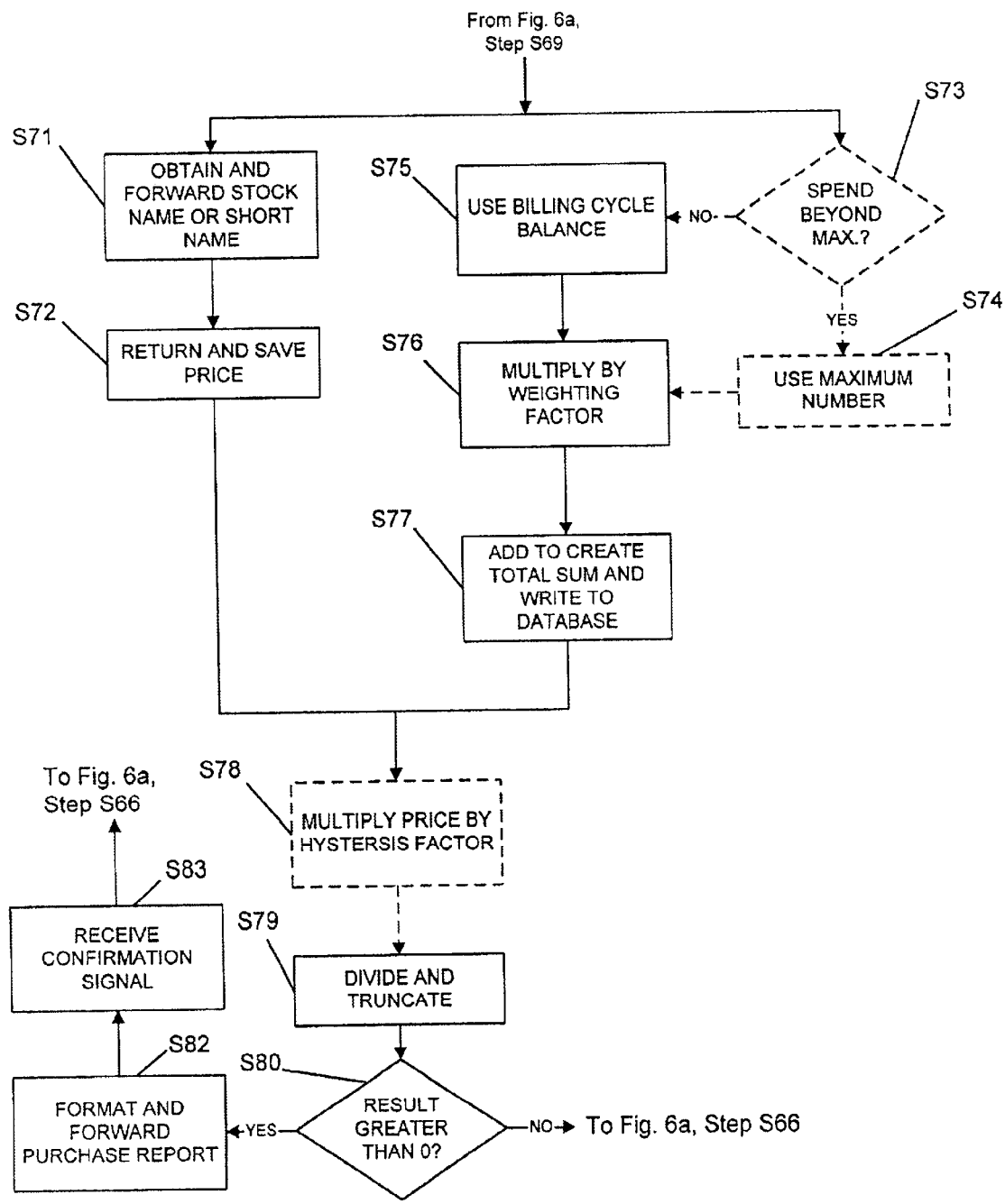

FIGS. 6a and 6b show a flow chart in accordance with the present invention. Optional process steps described in conjunction with FIGS. 6a and 6b are shown in dashed lines. The process begins at step S60, in which the customer uses any of the transaction media shown in FIGS. 1–4, or equivalents, to make a purchase. As the customer makes more and more purchases on a particular transaction medium, a monthly or periodic balance is generated. Eventually, the periodic billing cycle ends, say on the 5th of every month, for that customer, and it is time to either bill the customer for his purchases (credit or debit cards) or provide a summary (ATM/CAT or electronic commerce) for transactions. Also at this time, the customer's periodic balance is used to calculate earned incentive points to determine if the customer is entitled to receive shares of stock in a company using the incentive points. It should be noted that alternative embodiments or the present invention could be initiated by the clock 51 showing the end of a quarter or a year instead of a billing cycle. It follows then that the Master List 55a is comprised of all credit card customers rather than a select few in an embodiment that operates on a non-billing cycle cycle.

Clock 51 begins this billing/statement process by registering the day of the month at step S61. Bill generator 52 notices when the day changes and generates a bill/statement for the customer. In addition, the bill generator 52 also informs the server 50 of the present invention to calculate and redeem incentive points. This is done when the bill generator 52 sends a signal to the controller 54 through the access unit 53 and bus structure 63, which initiates the incentive point process, which is also at step S61.

In response to the signal from bill generator 52, the controller 54 resets the counter 54a and initiates the creation of a Master List 55a in memory 55 by sending a signal to the access unit 53 telling the access unit 53 to retrieve every customer account number for every customer being billed or provided with a statement on that day, at step S62. In alternative embodiments, the Master List 55a is comprised of contest winners or every customer rather than particular customers receiving bills and statements.

Compiling the Master List 55a is relatively straightforward, as the database 56 contains all of the customers' account numbers, profiles and days on which they are billed or provided with statements. In addition to those customers being billed or provided with a statement, those accounts with HOLDS on their incentive points are also inserted into the Master List 55a, as is described in more detail below. When the database 56 is finished downloading this data, the Master List 55a is complete.

At step S63, the controller sends the value in counter 54a to memory 55 to access an account number from the Master List 55a. The Master List 55a is a stack, and the counter 54a is a pointer to that stack for retrieving particular account numbers. In response to the memory 55 receiving this counter 54a value, the memory 55 forwards the corresponding account number to the access unit 53, which in turn uses that account number to retrieve the corresponding Customer Profile from database 56. Step S63 concludes when the requested Customer Profile is loaded into the Customer Profile 55b section of memory 55.

The Customer Profile 55b includes data useful for transactions. Data such as the customer's name, account number, customer address, home and work phone numbers, the customer's monthly balance (credit or debit card) or additions and subtractions to the account (ATM/CAT or electronic commerce), holdover incentive points from previous billing cycles, whether or not a HOLD has been placed on the account, the duration of the hold, whether or not the customer has a STOP placed on the account to prevent him from receiving incentive points, a data field titled INFORM_MIN, which is used to keep track of whether or not the customer has been previously informed of being below a minimum purchase requirement, and the name of the company or trading name (e.g., the three or four letter short name used at the exchange to identify the company) in which stock is purchased.

After the Customer Profile 55b is loaded into memory 55, the controller 54 checks the STOP field of the Customer Profile at step S64. A STOP placed on a customer's account acts as a barrier in that it prevents the system from completing execution of the process. If the financial institution managing the financial transaction medium has placed a STOP on incentive points, the controller 54 reads this STOP and forwards a signal to the bill/statement generator 52 instructs it to print a statement informing the customer that no incentive points were earned this billing period and no stock was purchased at step S65. The financial institution may decide to put a STOP on incentive points for reasons such as failure to make minimum payments, being late with payments, or overdrawing an account. In an alternative embodiment, a STOP may be placed on the account to prevent earning incentive points this billing cycle for payments not made for the previous billing cycle. In other words, the process of the present invention may operate one month behind the billing cycle such that the financial institution has a chance to place a STOP on incentive points to be given this month based on last month's purchases. The counter 54a advances at step S66 and the next Customer Profile is obtained at step S63.

If there is not a STOP placed on the account, the controller 54 checks the HOLD field to see if the customer himself has placed a HOLD on his incentive points. A HOLD placed on a customer's account acts as a barrier in that it prevents the system from completing execution of the process. Typically, a customer may want to place a HOLD on his account if he believes the stock market is unstable and does not want to purchase a stock today that will be worth less tomorrow. If the controller 54 determines there is a HOLD at step S67, the controller then checks a HOLD DATE field to determine if the HOLD has expired at step S68. The card-issuing institution may wish to override the HOLD in the interest of satisfying a co-branded company or to force the customer to redeem his incentive points for housekeeping purposes. If the controller 54 determines that a HOLD has been placed on the account at step S67 and that it has not expired at step S68, then the counter 54a is advanced at step S66 so as to retrieve the next customer account number from the Master List 55a, which is used to obtain the next Customer Profile 55b.

If the controller 54 determines that there is no HOLD at step S67, or that an applied HOLD has expired at step S68, the controller then checks to see if a minimum purchase was made during the corresponding billing cycle so as to qualify the customer for earning incentive points at step S69. Since one of the motivating factors for a card issuing institution is to issue incentive points to enhance the use of its cards and other financial transaction media, the financial institution may want to require the customer to use the financial transaction medium for a minimum amount of expenditures before the customer may reap the benefits of a stock purchase or accrue additional incentive points. In order to do this, the arithmetic logic unit 57 is loaded with both the Minimum Balance Factor 55f and the monthly purchases/transactions from the Customer Profile 55b, and the arithmetic logic unit 57 compares the two at step S69.

The controller 54 checks the result of that comparison at step S69, and if the customer has not spent more than the minimum amount, the controller 54 then checks to see if the customer has previously been informed of this fact at step S70 by checking the INFORM_MIN field of the Customer Profile 55b in memory 55. If the customer has not been informed of this fact, the controller 54 sends a signal to the bill/statement generator 52 informing it to either add a line to the present bill or statement to be sent to the customer, or to generate a new, independent report informing the customer of his below minimum financial transaction media usage at step S65. The bill/statement generator 52 then updates the INFORM_MIN filed of the customer at step S65. If the controller 54 determines that the customer has been previously informed of his below minimum usage at step S70 or that the customer is presently being informed of his below minimum usage at step S65, the controller 54 advances the counter 54a at step S66 so the next Customer Profile 55b may be retrieved from the database 56.

If the controller 54 determines the customer did use the transaction medium more than the minimum required at step S69, the system goes through two processes concurrently. The first is the accessing of the current price of the stock to be purchased, and the second is the calculation of how many incentive points the customer has accrued.

The first concurrent process obtains the price of the stock being purchased. At step S71, the controller 54 obtains the name or short name of the company associated with that customer from the Customer Profile 55b in memory 55. This piece of data is forwarded to the access unit 58 over the bus structure 63 at step S71. The access unit forwards the request for the stock price by bundling the name or short name of the company into a message and forwarding it over the network 60 to a stock quoting service 59, also at step S71. The stock quoting service 59 returns the appropriate price at step S72 to the access unit 58 over the network 60. The price is then stored in the Price 55c section of memory 55 at step S72.

The second concurrent process involves determining how many incentive points the customer has acquired. At step S73, the system determines if the customer has used his card beyond a maximum. The reason for capping a customer's incentive points is because stocks, depending on the company, can be quite expensive. The card issuing institution and/or co-branded company may desire to limit its/their costs on this incentive program. Thus, to keep some customers from overusing their credit card or other transaction medium to the detriment of the card issuing institution or co-branded company, a Maximum Balance 55h in memory 55 is used to limit how many incentive points a single customer may earn in a billing cycle.

To make this determination, the controller 54 loads the arithmetic logic unit 57 with the Maximum Balance 55h from memory 55 and this billing cycle's balance from the Customer Profile 55b from memory 55 at step S73. The arithmetic logic unit 57 compares the two values and the controller 54 reads the arithmetic logic unit's results at step S73. If the customer's billing cycle balance is too large, the system uses the value stored in the Maximum Balance 55h in memory 55 at step S74. If the customer's billing cycle balance is lower than the maximum allowed, that value is used in the following step, step S75.

At step S76, the arithmetic logic unit 57 multiplies the number selected at step S73 by the Weighting Factor 55e. This weighting factor is typically a percentage such as 5% but it can also be any number desired, including 1 or a number larger than 1, by the financial institution. As an example, if the customer spends $200 using a particular financial transaction medium during that billing cycle, he will receive 10 incentive points. This sum is then written into the database 56.

At step S77, the arithmetic logic unit adds the incentive points earned that billing cycle to the incentive points earned in previous billing cycles to generate a sum of incentive points.

At step S78, the controller 54 loads the arithmetic logic unit 57 with both the Price of the stock 55c and the Hysteresis Factor 55g from memory 55, and multiples these two numbers. The Hysteresis Factor 54f is an optional feature used to allow for the fact that stock prices are dynamic and can vary from the time this process is completed to the actual time the stock is purchased. To compensate for this fact, the price of the stock is artificially inflated by a factor so that the total amount of incentive points used to purchase the stock will be lower than the true value of the stock. In this way, should the stock price rise before the actual purchase is made, the system will have compensated for this fact and the customer will still receive his stock. Without this Hysteresis Factor 55g, there is a chance that the purchase order could go out to the brokerage house 61 with insufficient funds to purchase a stock that increased just slightly above the total number of incentive points.

At step S79, the scaled stock purchase price is divided by the total sum of earned incentive points and that answer is truncated so that only the whole number portion is used (e.g., 5 divided by 2 is 2.5 which is truncated to 2). At step S80, the arithmetic logic unit 57 determines if the truncated result is greater than 0. If the truncated result is 0, the controller 54 increments the counter 54a at step S66 to process the next customer's account.

If the truncated result of step S80 is 1 or greater, the controller 54 sends parts of the Customer Profile (e.g.,. name, address) and the truncated result determined in step S79 to the report generator 62. The report generator 62 formats this data into a report the brokerage house 61 understands, and forwards the report to the brokerage house 61 at step S82. The brokerage house 61 then sends a confirmation signal back to the server 50 through the access unit 58 telling it that it has received the Report at step S83. An employee of the brokerage house 61 makes a purchase on the appropriate stock exchange. The controller 54 then advances the counter 54a at step S66 and the process continues with the next customer in the Master List 55a or the process terminates when the Master List has been exhausted.

Purchasing the Stock and Adjusting the Balance of Accrued Incentive Points

Figure 7:
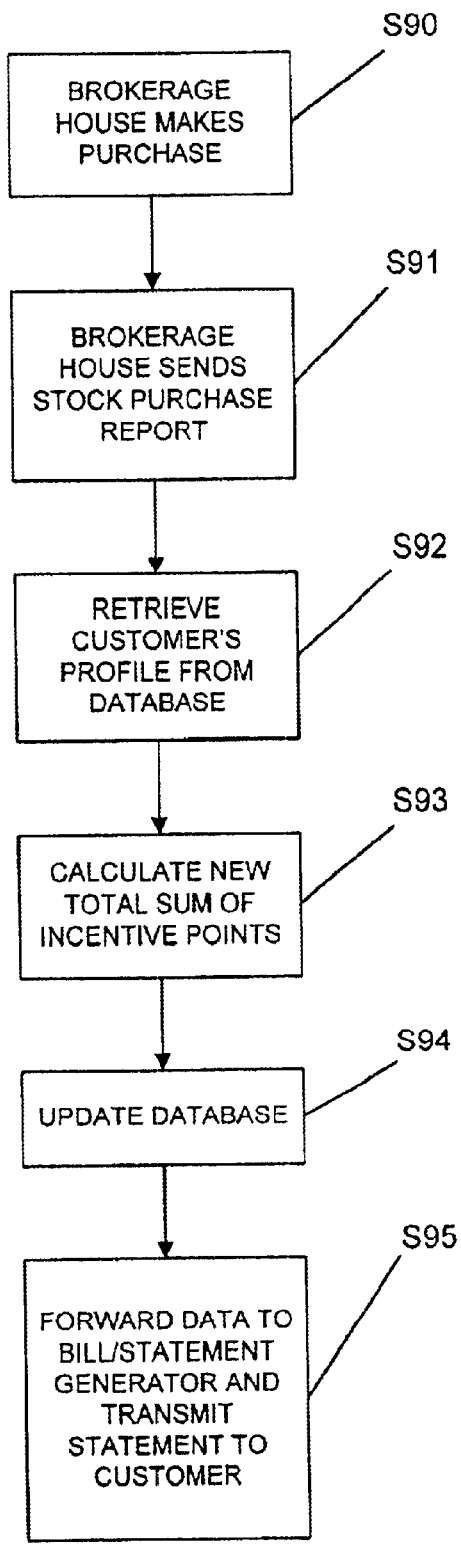
FIG. 7 is a flow diagram of a process relating to stocks purchased by a brokerage house in accordance with another embodiment of the present invention.

FIG. 7 shows another process of the present invention that demonstrates the steps used when the stock(s) are purchased by the stock purchasing institution. In general, the institution makes the purchase and sends data back to the system which keeps track of customers' incentive points. The data reflects the price paid, the number of stocks purchased and an identifier (i.e. name or account number) for the customer. The system then subtracts the appropriate amount of incentive points and stores the remainder in a database for future calculations. The final part of the process is to send some form of a report informing the customer about how many stocks have been purchased on his behalf as well as how many incentive points he has remaining.

In FIG. 7, at step S90, the brokerage house 61 makes the stock purchase. It should be noted the purchase may include purchasing multiple shares of stock. At step S91, the brokerage house 61 sends an electronic message over the network 60 to the access unit 58 of server 50. The message contains the customer's name and address, account number from the brokerage house, financial transaction medium number, the total dollars paid for the stock(s), the number of shares purchased, and the price per stock, as well as the date and time the stock(s) were purchased. The message from the brokerage house 61 is stored in the Purchase Report section 55d of memory 55. At step S92, the controller 54 requests the customer's profile from the database 56 via the access unit 53, which is stored in the Customer Profile 55a of memory 55. At step S93, the server 50 determines the number of incentive points the customer owns. The controller 54 first loads the arithmetic logic unit 57 with the total sum of earned incentive points and the total dollars spent by the brokerage house 61, and subtracts the dollars spent by the brokerage house 61 from the total sum. The Customer Profile 55b is updated with the new remaining incentive points, and the database 56 is updated via the access unit 53 at step S93. The controller 54 forwards the Purchase Report 55d and the Customer Profile 55b to the billing/statement unit 52 at step S94. The billing/statement unit 52 generates either a separate report, or appends a report to the generated bill/statement, informing the customer about the stock purchase made and how many incentive points he has remaining.

Continuously Calculating Newly Accrued Incentive Points and Determining if a Stock is to be Purchased FIG. 8 shows a flow diagram of the process according to another embodiment of the present invention. FIG. 8 is similar to FIG. 6b, however FIG. 8 uses the customer's purchase in a continuous fashion as the initiating factor rather than waiting for the billing cycle to commence as was done in FIGS. 6a and 6b. In other words, the process is continuous based upon the usage of the customer's financial transaction medium rather than being based upon a particular day of the month or the end of the quarter or year. Much of the detail of the description of FIGS. 6a and 6b is applicable to the flow diagram of FIG. 8.

The process shown in FIG. 8 begins when the customer makes a purchase with a financial transaction medium such as a credit card. A purchase report is generated by the merchant and sent to the financial institution, which manages the financial transaction media at step S100. At step S101 the server 50 retrieves the customer's profile from the database 56.

Like FIG. 6b, the process of FIG. 8 has two concurrent subprocesses. The first subprocess obtains the name or short name of the company from which the stock purchase is to be made, at step S102. The name or short name is used to make a price request from a stock quoting service 59, which is stored at 55c within memory 55.

The second concurrent process multiplies the amount of the purchase from step S1100 by the Weighting Factor 55e at step S104. The result is added to previous purchases stored in the customer's profile at step S105, and the sum is written to the database 56.

The sum of step S105 is divided by the price of the stock stored in 55c of memory 55 and the result is truncated at step S106. At step S107, the system determines if the result of step S106 is greater than zero. If it is not, this is an indication that the customer does not have enough incentive points accrued to purchase at least one share of stock.

If the result of step S106 is determined to be greater than zero at step S107, the server formats a report to send to the brokerage house at step S108. At step S109, the server 50 receives a confirmation signal indicating that that the brokerage house 61 has received the stock purchase order.

While the present invention has been described above using specific examples, it should be clear to one of ordinary skill in the art that certain modifications may be made to the above description without departing from the scope of the appended claims. For example, beyond the various financial transaction media shown in FIGS. 1–4, it is also envisioned that a phone card could also be used to provide incentive points to customers as they place more money on their cards. In addition, while the above description particularly deals with purchasing stock in a corporation, it is also within the scope of this invention to purchase other assets, such as bonds and treasury bills.

Additionally, the present invention may be used in particular situations to build customer loyalty to specific corporations. For example, the credit card may be issued as part of an employee's compensation package. This scenario is best seen when a card that is co-branded with the employee's corporation is issued to the employee or when the employee is given a corporate card. The employee will establish stronger feelings of loyalty to the corporation as his amount of stock in the corporation increases through the use of his co-branded credit card. This type of employee benefit may be used to offset a manager's burden for extensive travel. In this case, a manager uses his corporate card to purchase all of the airline tickets and receives stock in the corporation. This program for managers not only compensates the manager for traveling extensively but also builds loyalty and pride within the manager towards the corporation as he gains more and more ownership of the corporation. In addition, this program for employees also gives each employee a unique incentive program (i.e., each stock is unique) which goes to building loyalty and confidence in the employer corporation.

In a similar situation, a corporation may agree with a financial institution to issue either co-branded or non-cobranded cards to stock holders. Again, the incentives to the share holders are to use the credit card more to obtain more stock which benefits the financial institution in increased balances and fees, benefits the corporation in feelings of goodwill between the corporation and the share-holders as their interest in the corporation grows which each additional stock. Instead of receiving a higher salary, the employee may opt to receive incentive points redeemable for stock in the corporation.

The present invention may also be used in conjunction with special events or for short periods of time. An example would be the purchasing of stock in a corporation using credit cards from an issuing institution on the 50th anniversary of the corporation's existence. This special event would run for a short time, such as a year, and then end. In this example, the credit card may not be co-branded with the corporation having the anniversary, yet the method and system will still work the same as described.

Also, the present invention may be used to boost any financial transaction medium usage or for a contest. In this example, the issuing financial institution runs a promotion for a month, offering these incentive points redeemable for stock in an effort to promote lagging usage of the financial transaction medium. Alternatively, the issuing financial institution may use a contest format to promote increased usage of a particular financial medium (e.g., "Every month, the card-issuing financial institution will select 1,000 customers with balances of $500 or more to receive stock in a company").

Another variation includes the increasing of factors. For example, the Hysteresis Factor 55g is typically a percentage used to accommodate shifts in the market. This factor could be made much larger such that a stock purchase does not go through until the customer has enough to purchase five or so shares of stock in the corporation. This reduces the number of trades the brokerage house 61 has to make and reduces the cost of maintaining the system.

Another variation to reduce trading costs is to consolidate purchases. The above examples include the sending out of one report for each customer to the brokerage house 61. Instead, the reports for the various stock purchases could be accumulated into a single global report. In this manner, the brokerage house 61 makes a few large stock purchases and then distributes each individual stock to each individual customer. Along this line, the process described above could be performed at night, such that the brokerage house 61 has the report(s) waiting for it the next morning. This alternative includes performance of the data processing at a time when resources, such as the database and the network, are under a lesser demand, and it also prepares the brokerage house to make the purchase based on the previous day's closing prices. Thus, the prices are more likely to be stable first thing in the morning, so that reports sent to the brokerage house are more likely to be answered with purchases instead of messages stating "Inadequate Funds."

Another obvious embodiment of the present invention includes processing all customers of a particular financial institution once every month, quarter or year. These embodiments drastically reduce the administration costs of managing the various customers" accounts as well as reducing the transactions costs incurred by the brokerage house 61.

Another embodiment within the scope of the present invention utilizes daily average balances of stocks to determine if the particular customer has acquired enough incentive points to purchase the stock. This facet of the present invention works best when the customers' incentive points are calculated at night. Thus, market closes and the stock quoting service produces the average of the day for each needed stock. The customers' total weighted balances are compared against this average stock price to determine if the individual customer has enough incentive points to purchase the stock. By using the average stock price, an additional hysteresis factor is included into the algorithm such that a small fluctuation in the price of the stock before the purchase is made will not necessarily raise the price of the stock beyond the total incentive points earned.

It should also be noted that many of the steps described above and listed in the appended claims may be rearranged without departing from the scope of the present invention.

What is claimed is:

1. A method of placing a purchasing order for a financial asset comprising:

summing at least one purchase made by a customer to form a sum, wherein the customer uses a particular financial transaction medium to make the at least one purchase and further wherein the particular financial transaction medium is associated with a seller of the financial asset;

multiplying the sum by a first factor to form a weighted sum;

retrieving a price of the financial asset;

comparing the price of the financial asset to the weighted sum to determine if the weighted sum is at least equal to the price of the financial asset; and forwarding a message to an appropriate institution indicating that the institution is to purchase the financial asset, wherein the message is forwarded when the weighted sum is at least equal to the price of the financial asset.

2. The method of claim 1 further comprising:

changing the weighted sum by adding a running sum comprised of at least one previously calculated weighted sum to the weighted sum; and wherein the changing of the weighted sum is performed before the comparing of the price of the financial asset to the weighted sum.

3. The method of claim 2 further comprising:

saving the weighted sum so as to form the previously weighted sum; and wherein the saving of the weighted sum is performed after the comparing of the weighted sum to the price of the financial asset and it is determined that the price to the financial asset is more than the weighted sum.

4. The method of claim 2 further comprising:

receiving a report form the institution indicating an actual price paid for the financial asset;

subtracting the actual price for the financial asset from the weighted sum; and wherein the subtracting of the actual price for the financial asset from the weighted sum is performed after the changing of the weighted sum.

5. The method of claim 1 further comprising:

changing the price of the financial asset by multiplying the price of the financial asset by a second factor before comparing the price of the financial asset to the weighted sum.

6. The method of claim 1 further comprising:

comparing the sum to a predetermined minimum value; and if the sum is less than the predetermined minimum, automatically exiting the method.

7. The method of claim 1 further comprising:

comparing the sum to a predetermined maximum value and multiplying the predetermined maximum value by the first factor to form the weighted sum instead of the multiplying the sum by the first factor to form the weighted sum; and wherein the comparing of the sum to the predetermined maximum value and multiplying the predetermined maximum value by the first factor to form the weighted sum are performed before comparing the price of the financial asset to the weighted sum.

8. The method of claim 1 wherein the method is available to the customer for a limited time.

9. The method of claim 8 wherein the limited time coincides with a special event.

10. The method of claim 1 wherein the method is implemented to encourage use of the particular financial transaction medium.

11. The method of claim 1 further comprising:
selecting the customer from a master list of customers.

12. The method of claim 11 wherein the master list is comprised of contest winners.

13. The method of claim 11 wherein the master list is comprised of customers being billed on a particular day.

14. The method of claim 1 wherein the method is initiated by a clock registering a particular day.

15. The method of claim 1 wherein the method is initiated by the customer making a purchase.

16. The method of claim 1 wherein the method is initiated on a basis consisting of at least one of the following: monthly, quarterly and yearly.

17. The method of claim 1 where the method is implemented as part of the customer's compensation package for working for a company.

18. The method of claim 1 further comprising:
determining the status of a barrier flag; and if the barrier flag is set to a particular value, automatically exiting the method.

19. The method of claim 1 wherein the financial asset consists of at least one of the following: a stock, a bond and a treasury bill.

20. The method of claim 1 wherein the particular financial transaction medium consists of at least one of the following: a credit card; a co-branded credit card; a corporate credit card; a smart card; an automatic teller machine card; a customer access terminal card and electronic commerce.

21. The method of claim 1 wherein the price of the financial asset is an average price of the financial asset obtained over a time period.

22. A system for placing a purchasing order for at least one financial asset comprising:
an arithmetic logic unit that determines how many points to award in association with a purchase made using a particular transaction medium wherein the particular transaction medium is associated with a seller of the at least one financial asset;
a database that stores the points;
a first access unit that forwards the points into the database and retrieves the points and out of the database;
a second access unit that obtains a price of the at least one financial asset and forwards a report requesting purchase of the at least one financial asset; and
a controller that controls the arithmetic logic unit, the first access unit and the second access unit so that 1) the arithmetic logic unit compares the points with the price of the at least one financial asset to determine if the points equal or are greater than the price of the at least one financial asset and 2) the second access unit forwards the report requesting purchase of the at least one financial asset based on the arithmetic unit's comparison.

23. The system of claim 22 wherein the particular financial transaction medium consists of at least one of the following: a credit card; a co-branded credit card; a corporate credit card; a smart card; a debit card; an automatic teller machine card; a customer access terminal card and electronic commerce.

24. The system of claim 23 wherein the financial asset consists of at least one of the following: a stock; a bond and a treasury bill.

25. The system of claim 23 wherein the first and second access units are the same.

26. The system of claim 23 wherein the first and second access units are different.

27. A method for encouraging use of a particular financial transaction medium associated with a seller of at least one financial asset; comprising:
receiving data indicative of a purchase of a good or service via the particular financial transaction medium wherein the data includes a value of the good or service purchased;
associating the value with a number of points;
summing the points to form a points sum;
automatically redeeming the points sum so as to purchase the at least one financial asset when the points sum is equal to or greater than a cost of the at least one financial asset.

28. The system of claim 27 wherein the particular financial transaction medium consists of at least one of the following: a credit card; a co-branded credit card; a corporate credit card; a smart card; a debit card; an automatic teller machine card; a customer access terminal card and electronic commerce.

29. The method of claim 27 wherein the at least one asset consists of at least one of the following: a stock; a bond and a treasury bill.

30. A method of accumulating stock in a corporation comprising:
receiving data indicative of a purchase of a good or service via a financial transaction medium associated with the corporation, wherein the data includes a value of the good or service purchased;
providing incentive points based on the value;
adding the incentive points to obtain a total of accrued incentive points; and
automatically purchasing at least one stock in the corporation when the total of accrued incentive points is at least equal to a price for purchasing a whole number of stocks.

* * * * *

UNITED STATES PATENT AND TRADEMARK OFFICE
CERTIFICATE OF CORRECTION

PATENT NO. : 6,895,386 B1  
DATED : May 17, 2005  
INVENTOR(S) : Richard Bachman et al.

It is certified that error appears in the above-identified patent and that said Letters Patent is hereby corrected as shown below:

Column 15,  
Line 53, please change "points and out of the database" to -- points out of the database --.

Signed and Sealed this

Twenty-fifth Day of October, 2005

JON W. DUDAS  
*Director of the United States Patent and Trademark Office*